United States Patent [19]

Tokui et al.

[11] Patent Number: 4,635,222

[45] Date of Patent: Jan. 6, 1987

[54] INTERFACE DEVICE FOR CONVERTING A COMPUTER PRINTER PORT INTO AN INPUT/OUTPUT PORT

[75] Inventors: Satoru Tokui; Susumu Sueyoshi; Keiichiro Nanba, all of Tokyo, Japan

[73] Assignee: Pioneer Electronic Corporation, Japan

[21] Appl. No.: 524,633

[22] Filed: Aug. 19, 1983

[30] Foreign Application Priority Data

Aug. 20, 1982 [JP] Japan .................. 57-144169

[51] Int. Cl.$^4$ .............................................. G06F 3/00
[52] U.S. Cl. .................................................. 364/900
[58] Field of Search ... 364/200 MS File, 900 MS File, 364/710, 171

[56] References Cited

U.S. PATENT DOCUMENTS

| | | | |
|---|---|---|---|
| 3,805,252 | 4/1974 | Morris et al. | 340/172.5 |
| 4,052,601 | 10/1977 | Corni | 364/104 |
| 4,129,901 | 12/1978 | Masuda | 364/900 |
| 4,254,460 | 3/1981 | Achter et al. | 364/141 |
| 4,339,794 | 7/1982 | Hideshima et al. | 364/200 |

OTHER PUBLICATIONS

Jacob Millman, *Micro-Electronics*, McGraw-Hill, 1979, pp. 182, 183.
Ciarcia, S., "Computer Controlled Security System for Your Home", BYTE, Jan. 1979, pp. 56–71.
Ciarcia, S., "Computer Controlled Security System for Your Home", BYTE, Feb. 1979, pp. 162–179.
Ciarcia, S., "Computer Controlled Security System for Your Home", BYTE, Mar. 1979, pp. 150–167.

*Primary Examiner*—Gareth D. Shaw
*Assistant Examiner*—Martin Yuen
*Attorney, Agent, or Firm*—Sughrue, Mion, Zinn, Macpeak, and Seas

[57] ABSTRACT

An interface device includes connections to a printer port of a computer apparatus, and logic circuitry for selecting a particular sensor from among one or more sensors based on data from the computer apparatus. A signal is fed back to the printer port by way of the port connections based on the output of the sensor selected by said logic circuitry.

5 Claims, 3 Drawing Figures

INTERFACE DEVICE FOR CONVERTING A COMPUTER PRINTER PORT INTO AN INPUT/OUTPUT PORT

BACKGROUND OF THE INVENTION

The present invention relates to a novel interface device, which permits a universal input/output to personal computers (hereinafter simply referred to as "PCs"), by using a printer port which is found on most PCs.

In general, the printer port of the PC is composed of DATA lines for sending out characters or graphic data to be printed by a printer, a $\overline{STB}$ line for sending out a synchronizing output signal allowing data to be read in the printer, that is, a $\overline{STB}$ (STROBE) (hereinafter abbreviated) signal, a $\overline{READY}$ line for receiving a signal informing whether or not data can be read in from the printer, that is, a $\overline{READY}$ (or $\overline{BUSY}$) signal, and an $\overline{ACK}$ line for receiving a data required pulse from the printer, that is, an $\overline{ACK}$ (ACKNOWLEDGE) (hereinafter abbreviated) signal (hereinafter the upper bar " ¯ " is omitted).

The timing chart of the DATA signal at the printer port in the PC and the control signals which are composed of STB, READY and ACK signals is as shown in FIG. 1. In the PC, first of all, a datum which is necessary for the DATA line is sent out, and then, a STB pulse requiring data to be read is developed as an output. The printer which has received the STB pulse makes the level of the READY signal high (H) so as to read the data (shown by the dotted lines (a) and (a') in FIG. 1). When the operations, for example, of reading the data or printing comes to an end, the level of the READY signal is made low (L) so as to supply the pulse (ACK), which requires data, as an input to the PC. Otherwise, the pulse (ACK) is supplied as an input to the PC as shown by the dotted line, so that the level of the READY signal is made low (L) in response to the rise thereof. The PC which has received the same prepares the next DATA (shown by the dotted line (b) in FIG. 1), and the STB signal is again developed as an output.

The sending and receiving of signals as stated above is relatively well standardized, and similar signal lines are used in PCs of different manufacturers. Therefore, the interface means, to which are connected machines and instruments via the printer port, is generally applicable to all such PCs.

However, since the main object of the printer port is that of transferring the printing data, the input to the PC is limited to the READY and ACK signals and the like even if the data are parallel data, and the role thereof is so determined. Therefore, if the printer port is used as an input/output port, the input information line to the PC would not be sufficient.

SUMMARY OF THE INVENTION

The present invention is an interface device in which the printer port of a PC can be used as an input/output port of other than the printer. The present invention provides an interface means which is adapted to increase the information input to the PC.

DETAILED DESCRIPTION OF THE PREFERRED EMBODIMENTS

In the following, the present invention will be described with reference to FIGS. 2 and 3.

Figure 1:
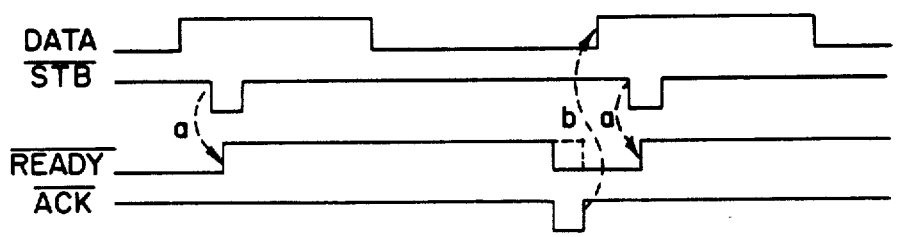
FIG. 1 is a timing chart of the input/output signals at the printer port of a PC.
Figure 2:
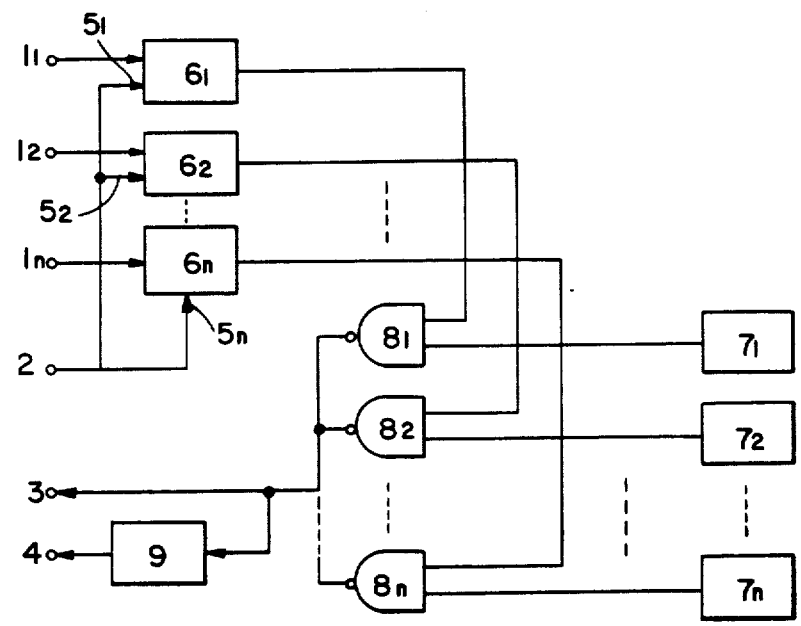
FIGS. 2 and 3 are block diagrams respectively showing embodiments of the interface means in accordance with the present invention.

FIG. 2 shows one embodiment in accordance with the present invention. In FIG. 2, $1_1$-$1_n$ are DATA terminals, 2 is a STB terminal, 3 is a READY terminal and 4 is an ACK terminal. These are respectively connected to the lines to which they correspond in the printer port in the PC, so that signals are sent and received by the PC. The DATA teminals $1_1$-$1_n$ are connected to the inputs of data latch circuits $6_1$-$6_n$, the data latch trigger terminals $5_1$-$5_n$ of which are connected to the STB terminal 2. The outputs of the data latch circuits $6_1$-$6_n$ are connected respectively to one input of NAND circuits $8_1$-$8_n$, the other inputs of which are connected to sensors $7_1$-$7_n$. The outputs of the NAND circuits $8_1$-$8_n$ are connected to the READY terminal 3, and also to the input of a one-shot multivibrator 9, the output of which is connected to the ACK terminal 4.

Each of the above-mentioned NAND circuits $8_1$-$8_n$ is provided with an output terminal of an open collector type, and the outputs are connected in parallel so as to form a wired OR connection.

Data at the DATA terminals $1_1$-$1_n$ are latched in the data latch circuits $6_1$-$6_n$ by the signals at the STB terminal 2. Now, if the datum of the terminal $1_1$ is at the H level and the data at the other terminals $1_2$-$1_n$ are at the L level, the outputs of the NAND circuits $8_2$-$8_n$ are at the H level without regard to whether the outputs of the sensors $7_2$-$7_n$ are at the H level or the L level. On the other hand, the output of the NAND circuit $8_1$ varies so as to be at the L level when the output of the sensor $7_1$ is at the H level and be at the H level when the output of the sensor $7_1$ is at the L level. In other words, the PC is able to detect the state of the sensor $7_1$ by setting the DATA terminal $1_1$ at the H level and the other DATA terminals $1_2$-$1_n$ at the L level. If the DATA terminal $1_2$ is set at the H level and the other DATA terminals are set at the L level, it is possible to determine the state of the sensor $7_2$. Likewise, if the DATA terminal $1_n$ is set at the H level and the other DATA terminals are set at the L level, it is possible to determine the state of the sensor $7_n$.

Figure 3:
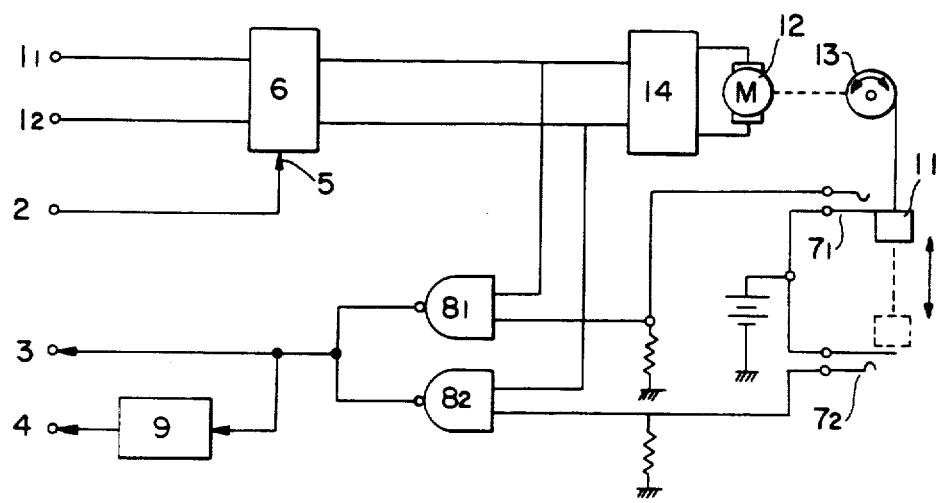

FIG. 3 shows an example applied to the control of a mechanical device, that is, a winch 13 for driving a load 11 by means of a motor 12, by the PC. The motor control circuit 14 is adapted to operate such that the winch 13 is rotated counterclockwise to raise load 11 when the datum from the DATA terminal $1_1$ which is latched by the data latch circuit 6 is at the H level and the datum from the terminal $1_2$ is at the L level. On the other hand, the READY terminal 3 is kept at the H level unitl one of the inputs of the NAND circuit $8_1$ is at the H level and the upper limit switch (sensor) $7_1$ is turned on. If the upper limit is reached so that the switch $7_1$ is turned on, the READY terminal is at the L level. At the same time, the ACK pulse is sent out to the ACK terminal 4 by the one-shot multivibrator 9. Conversely, when the load 11 is lowered, the PC may send out data such that the terminal $1_1$ is at the L level and the terminal $1_2$ is at the H level.

Although the data lines and the sensors are in one to one correspondence in accordance with the embodiments shown in FIGS. 2 and 3, it is also possible to permit selection of more sensors with fewer bit numbers if the data are subjected to logical operations by a logic circuit. For example, in the case of a datum of 8 bits, it is possible to make 256 selections.

Although the command to the interface means is also used for the selection of sensors in the embodiment shown in FIG. 3, it is also possible for the use of the data lines to be divided into two, that is, one for the command and the other for the selection of the sensors.

In accordance with the present invention as described hereinabove, since one sensor may be selected from among one or more sensors based on the data sent by way of the printer port of the PC, so that a signal based on the output is fed back to the printer port, it becomes possible to increase the feedback information for the command from the PC, thereby making it possible to perform more delicate control even if a printer port with fewer input terminals to the PC is used.

What is claimed is:

1. An interface device which is adapted to convert a computer printer port, having a number of data terminals for outputting N data signals from a computer for selecting one of N sensors, a strobe terminal for outputting strobe signals from the computer, a status terminal for receiving status information and a request terminal for receiving a request signal for the next data output, into an input/output port adapted to select one of the N sensors and then feed a status signal representing the status of the selected sensors back to the computer, said interface device comprising:

connecting means adapted to be connected to receive and latch the N data signals and the strobe signals from the computer printer port and output the status information and the request signal to the computer printer port; and logic means connected to said connecting means to receive the N data signals for selectively monitoring one of said N sensors and providing status signals to said connecting means, in response to the N data signals strobed from said connecting means and the status of the selected sensor, said connecting means providing status signals of the selected sensor to said status terminal and said request terminal of said computer printer port via said connecting means.

said logic means comprising a plurality of NAND gates, each having a first input connected to receive said N data signals of said connecting means, and a second input connected to said N sensors, the output of said NAND gates being connected in an OR configuration and adapted to provide the status signals of the selected sensor to said connecting means.

2. The interface device of claim 1 wherein said connecting means includes latch means adapted to receive at a first input, the N data signals from said number of data terminals of said computer printer port, and at a second input, signals from said strobe terminal of said computer printer port for strobing the N data signals to the plurality of NAND gates.

3. The invention of claim 2 wherein the strobe signals of said latch means are applied to one input of respective NAND gates.

4. The invention of claim 2 wherein said connecting means include N latch means and the output signals of said latch means are provided to a respective one of said NAND gates.

5. The invention of claim 3 wherein said logic means includes a pulse generator means and the OR configured output of said NAND gates forms an output signal to said computer printer port via the status terminal and an input to said pulse generator means, said pulse generator means having an output connected to said request terminal of said computer via said connecting means.

* * * * *